Jan. 13, 1970   KATSUJI HIRAHARA ET AL   3,489,103
APPARATUS FOR EXTRACTING FROZEN FOOD PRODUCTS
Filed Feb. 23, 1968   9 Sheets-Sheet 1
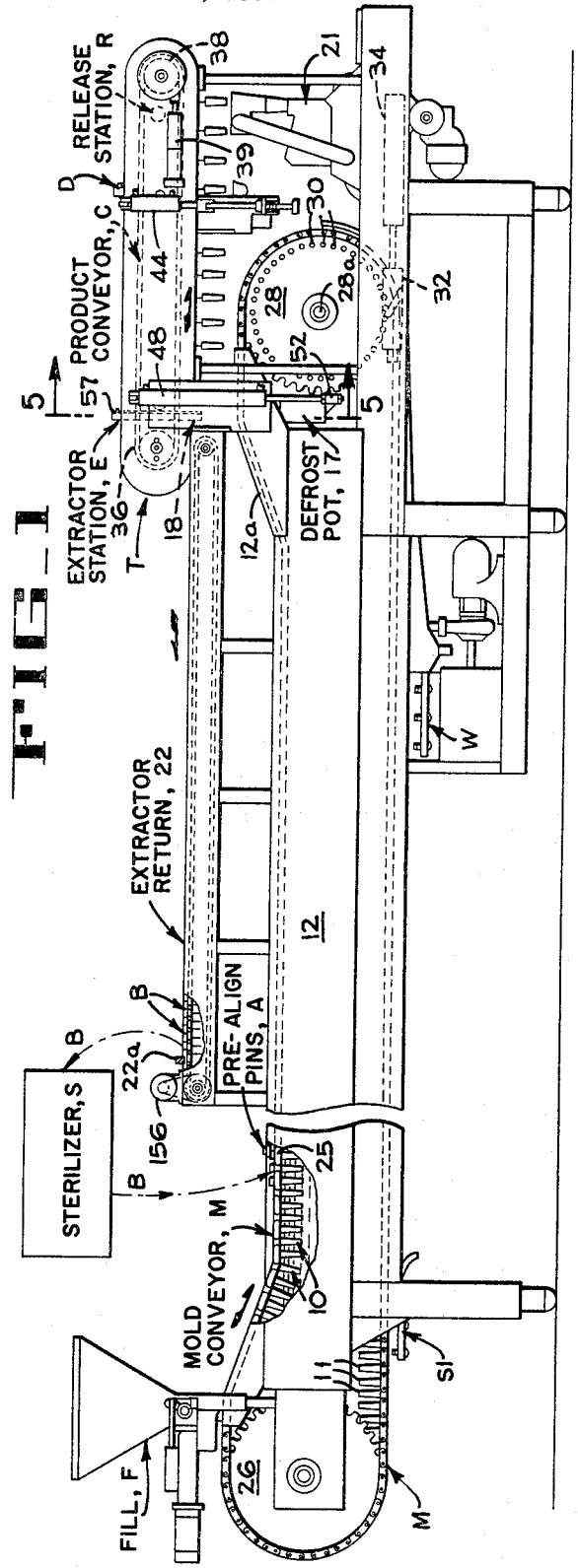
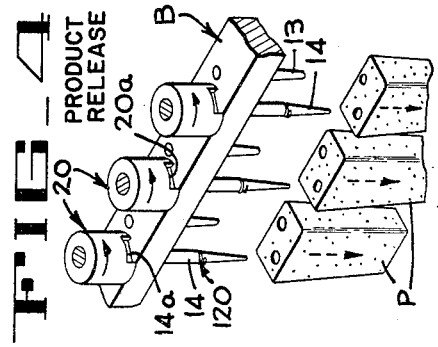
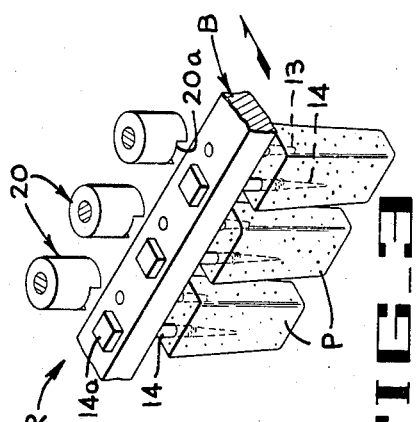
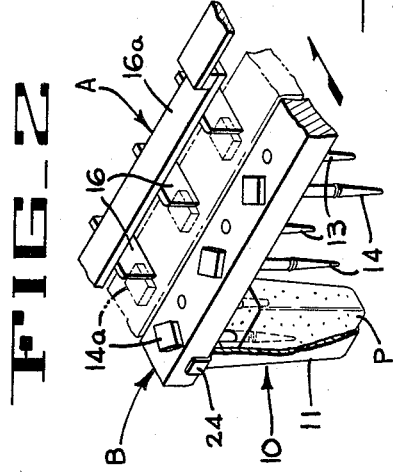
INVENTORS
KATSUJI HIRAHARA
ROBERT J. BETSCHART
BY F. W. Anderson
C. E. Tripp
ATTORNEYS

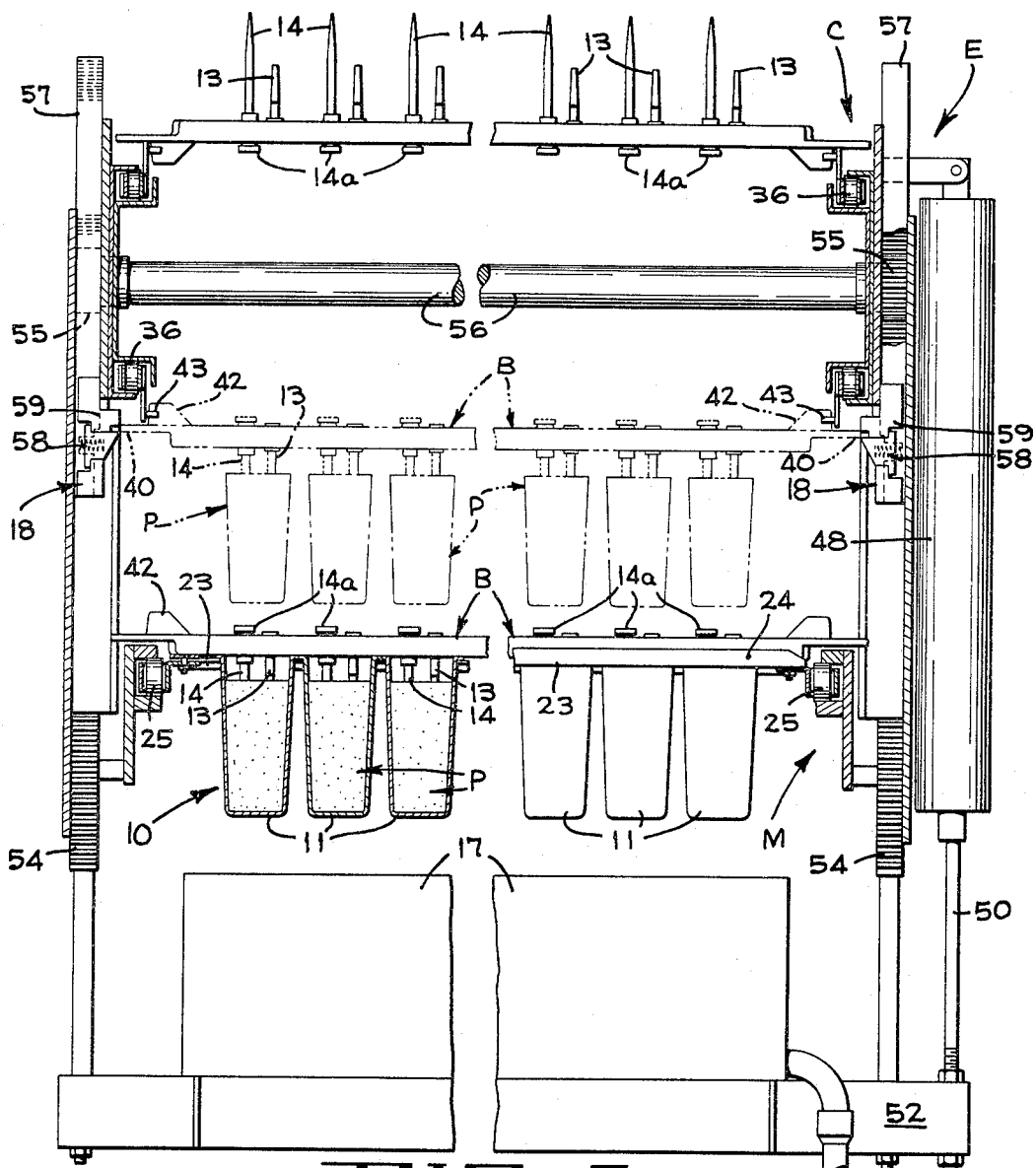
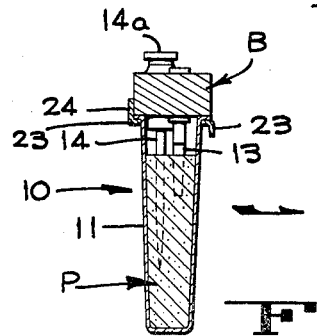

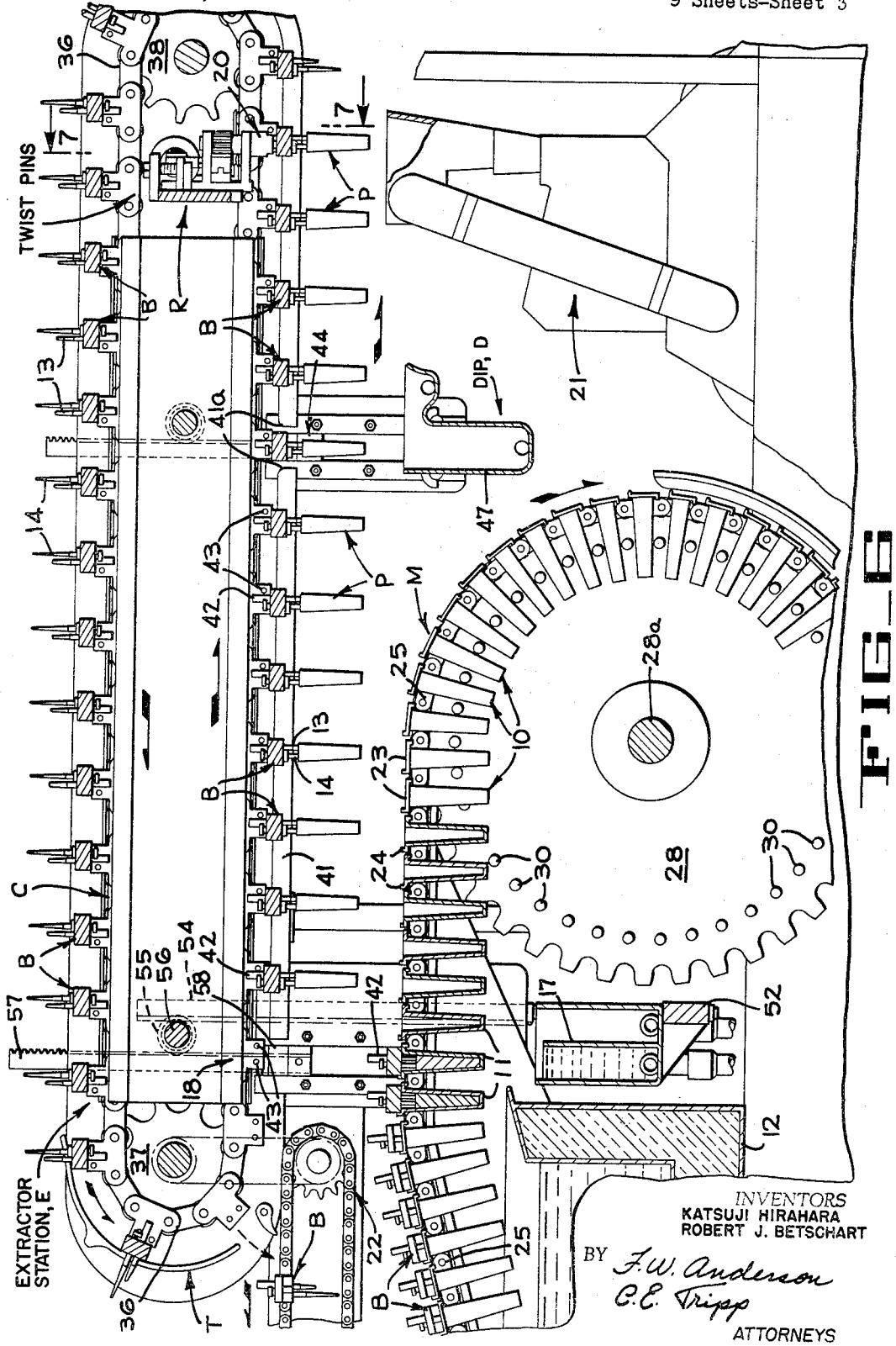

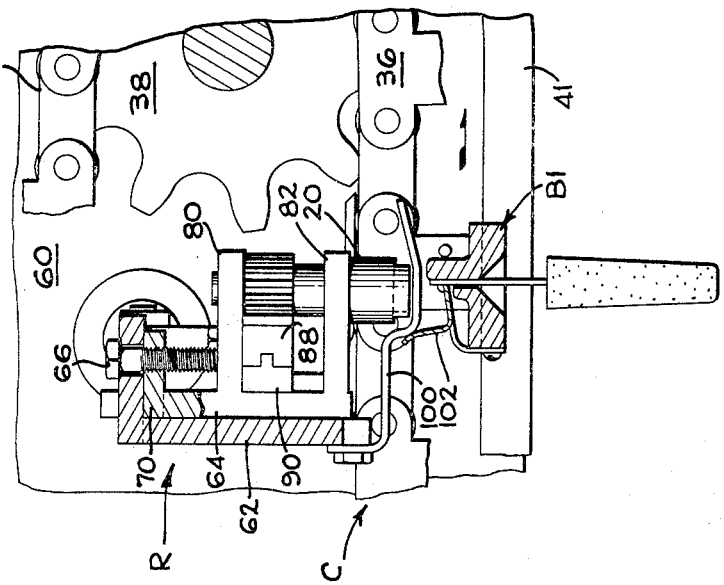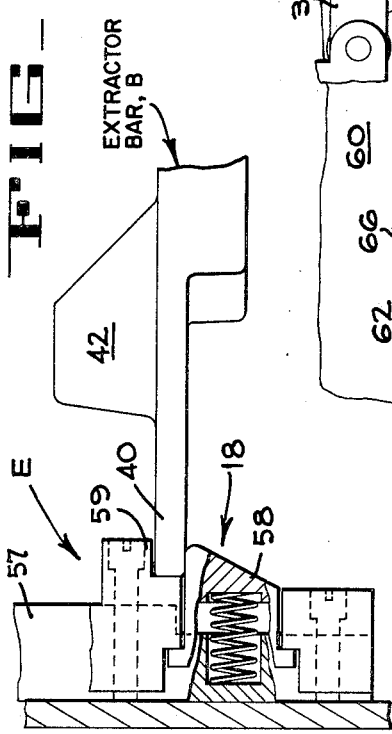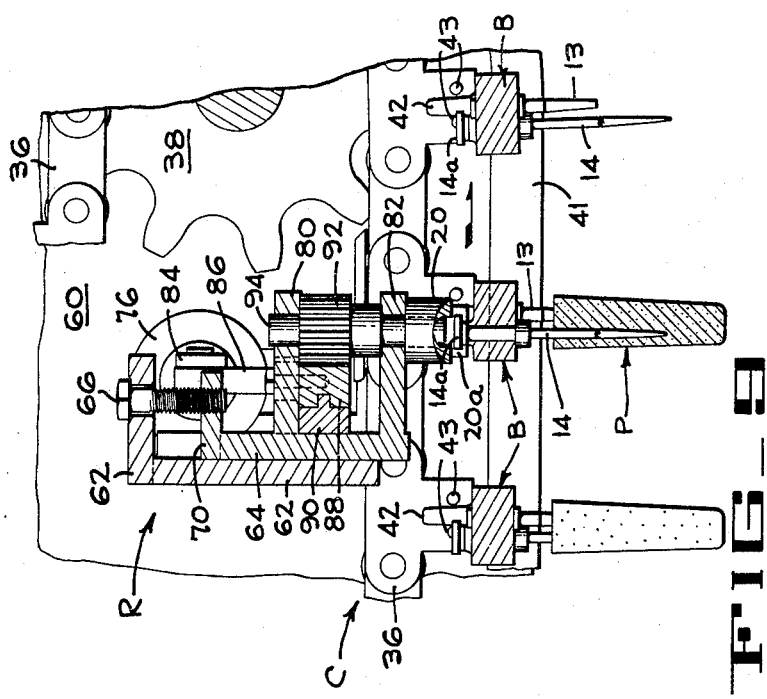

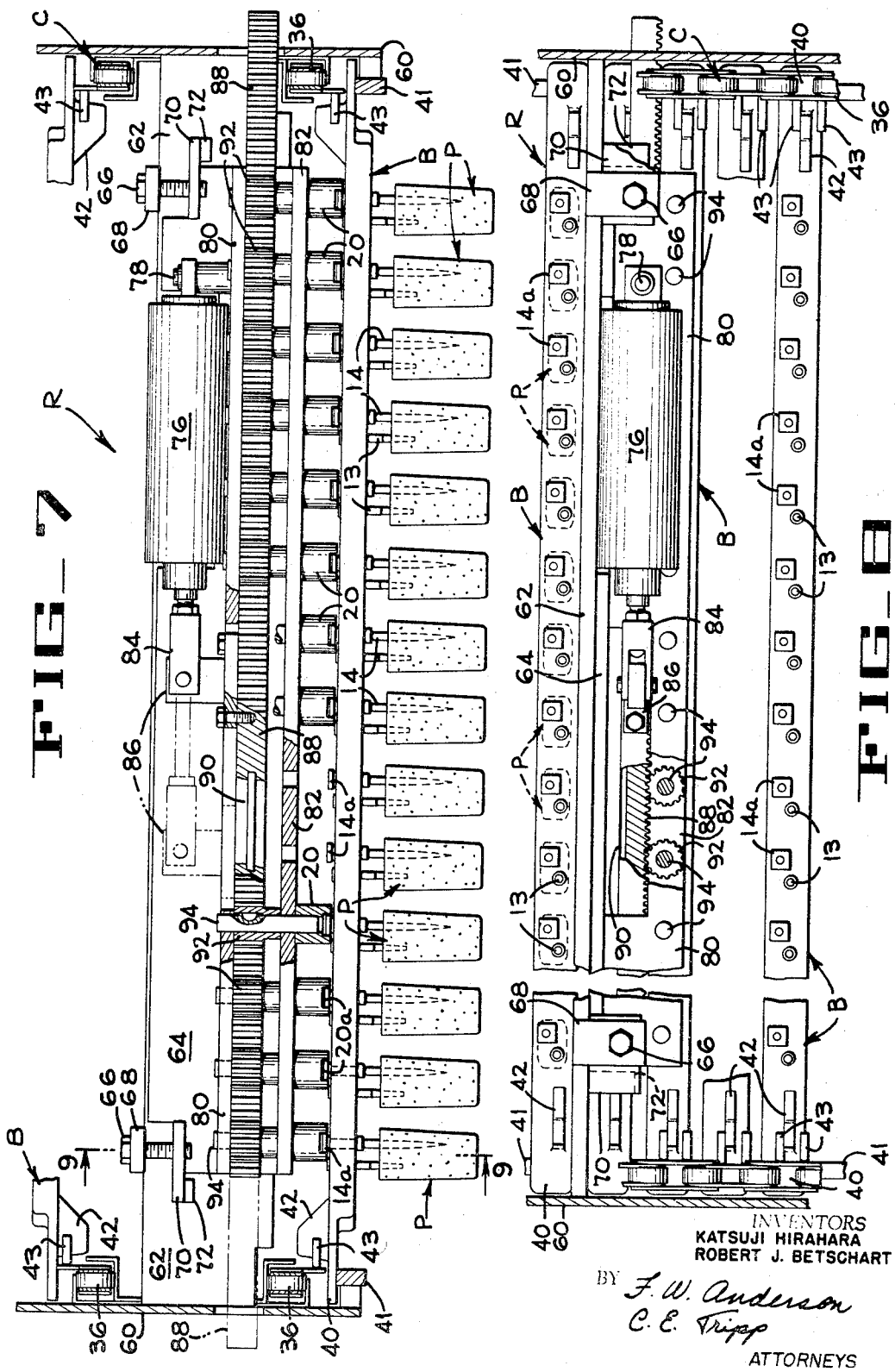

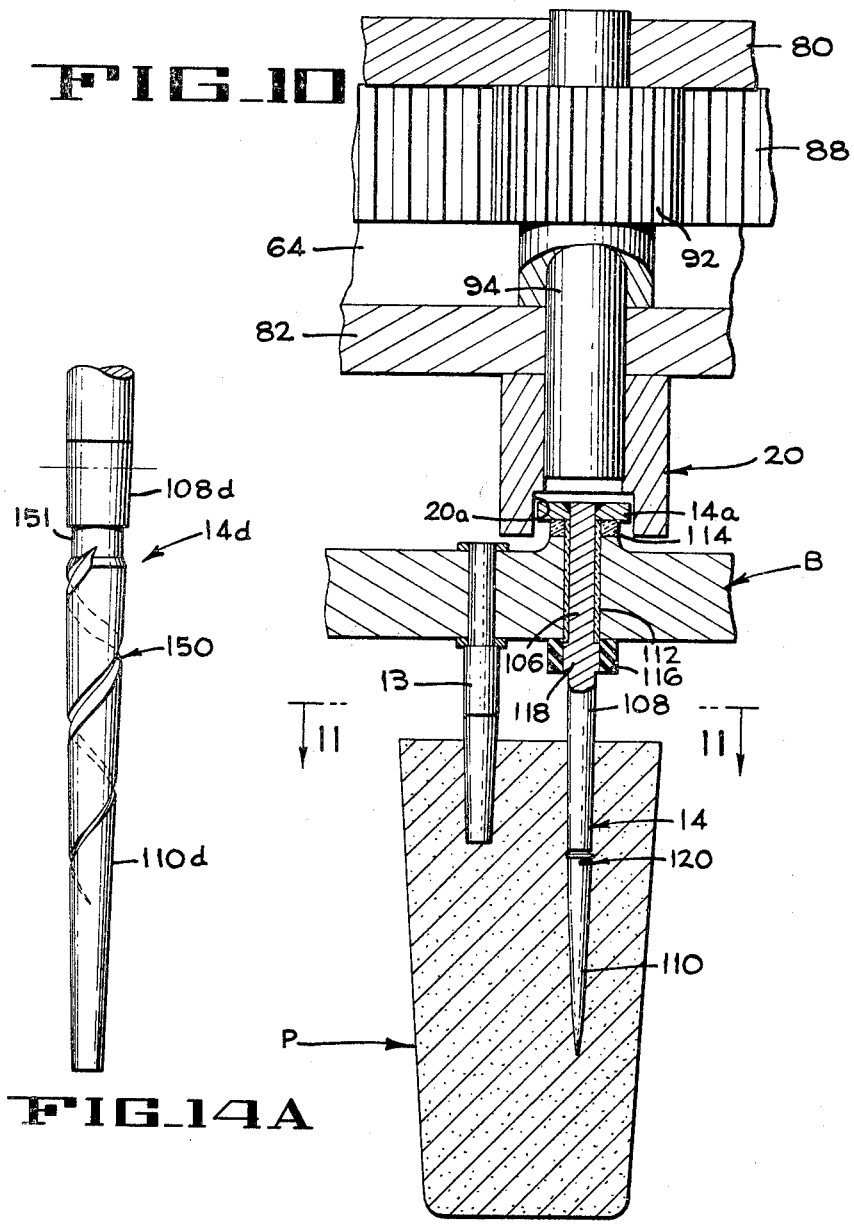
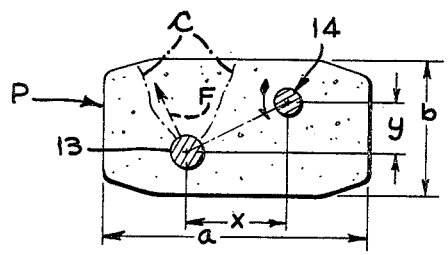

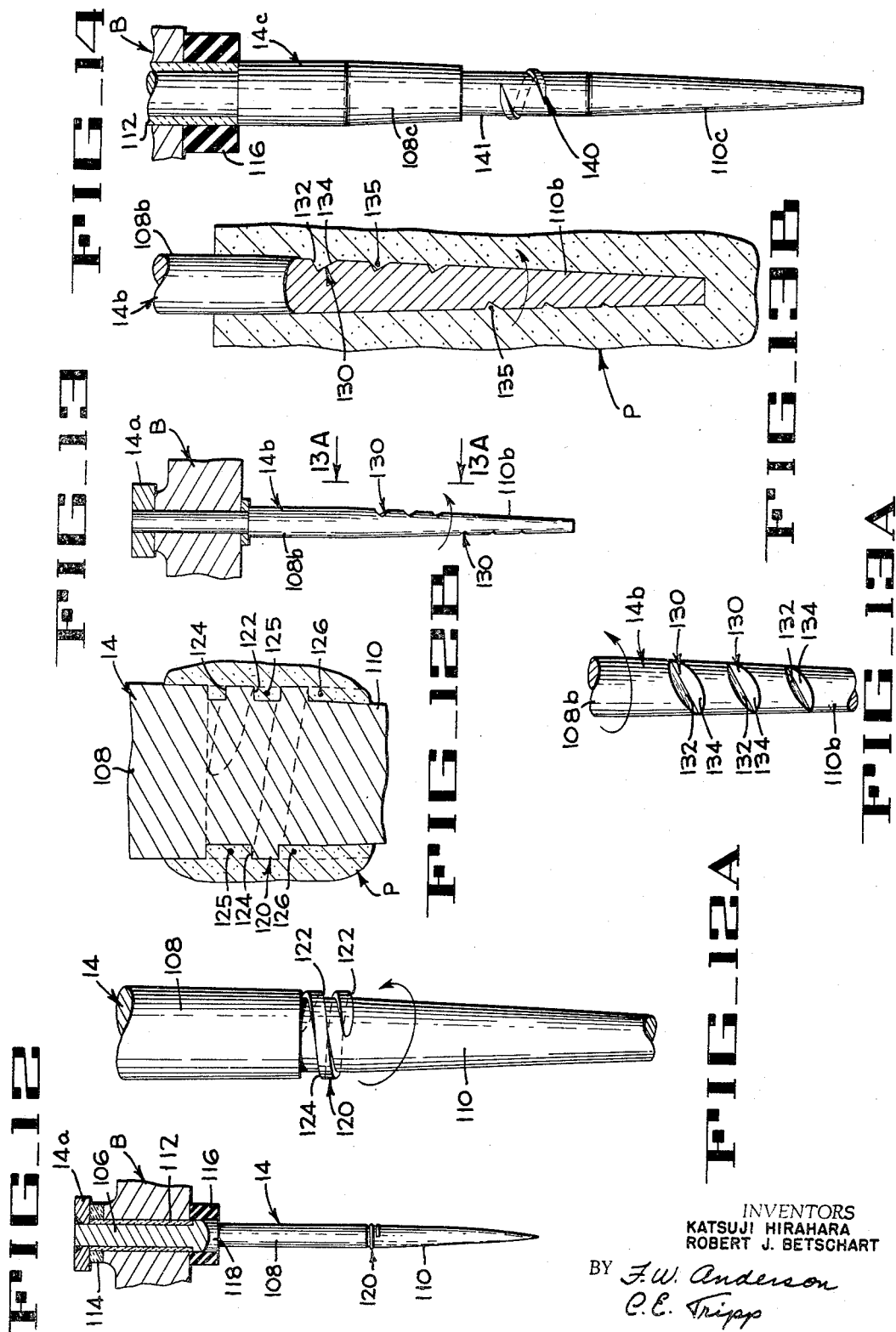

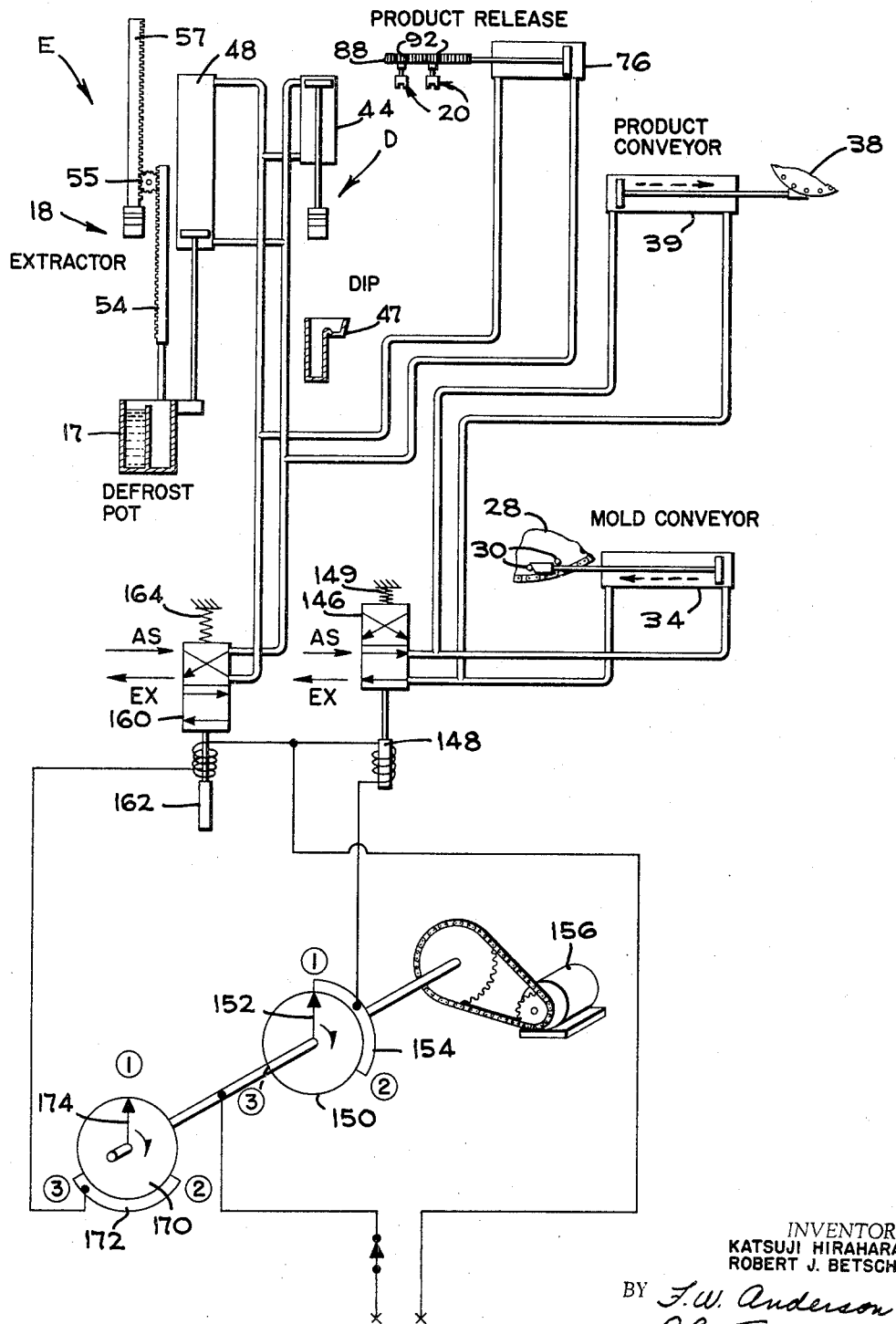

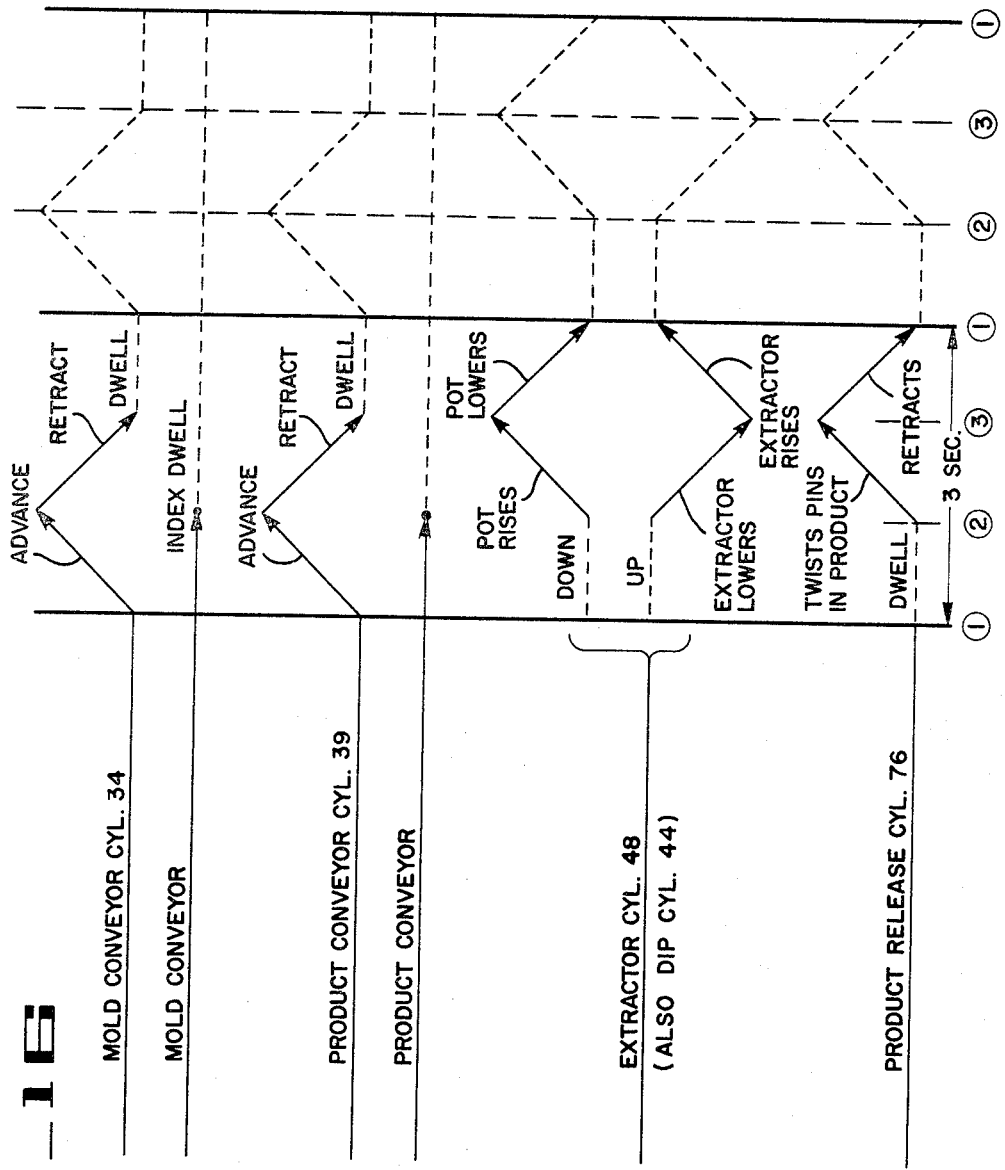

United States Patent Office 3,489,103
Patented Jan. 13, 1970

3,489,103
APPARATUS FOR EXTRACTING FROZEN FOOD PRODUCTS
Katsuji Hirahara, San Jose, and Robert J. Betschart, Sacramento, Calif., assignors to FMC Corporation, San Jose, Calif., a corporation of Delaware
Filed Feb. 23, 1968, Ser. No. 707,720
Int. Cl. A23g 5/02
U.S. Cl. 107—8        17 Claims

ABSTRACT OF THE DISCLOSURE

A machine for forming molded but stickless frozen food products includes a molding conveyor from which product extractor bars are transferred to a stripping conveyor. The product is stripped by rotating a tapered, helically ridged product release pin in each mold, with the torque taken by a shorter, tapered and non-rotary torque pin in the same mold. The release pins are rotated by a spline type coupling and gear assembly at the product release station of the machine, and they are heat-insulated from the extractor bars.

FIELD OF THE INVENTION

This invention relates to refrigeration, and more specifically to means for extracting frozen products or the like from their molds and then releasing the products from the extractors.

DESCRIPTION OF PRIOR ART

Lampman, 3,335,579, Aug. 15, 1967, discloses a stickless frozen food molding machine similar to the machine which embodies the present invention, except that slabs instead of individual articles are frozen. Also, the extractor pins depending from the extractor bars are smooth tapered pins as are all of the pins rotated by cam actions. A separate stripper device (FIG. 5) is provided to remove the products from their pins. The pins are not insulated from the extractor bars.

Lowenstein, 2,076,377, Apr. 6, 1937, discloses a frozen confection molding device whereby the extractor bars are lifted manually from the molds and the articles released by manually turning a pair of fusiform pyramidal extractor pins (FIGS. 9–11), which are relatively short and square in section. These pins are disposed along the midplane of the product and are not insulated.

SUMMARY OF THE INVENTION

In stickless frozen food machines of the type described, several criteria are present, some of which are not always compatible, particularly when individual bars of confection, etc. are provided. These criteria are:

(1) Development of an adequate extractive force between the frozen product and the pins depending into the products, to insure positive extraction of the frozen products from their molds. The extractive force available from the pins of the aforesaid patents is relatively weak.
(2) Releasing or ejecting the products from their extractors—
  (a) positively and reliably,
  (b) without external contact with the product during release,
  (c) without dislodging or breaking off pieces of the product,
  (d) while leaving the extractor pins clean and thus facilitating subsequent sterilization,
  (e) without dislodging chocolate coatings which may be present on the upper ends of the product bars, and
  (f) without fracturing the product bars under torque or reaction forces engendered by rotation of the release pins.

The pins of the aforesaid Lampman patent do not provide a relatively high extraction force nor do they positively eject the products. Also, since they have a different mode of operation it fails to meet criterion (2)(b), in that strippers are required.

In the embodiment of the present invention herein disclosed, individual bars of frozen confection, etc. are produced in a machine like that of the aforesaid Lampman patent, except that multiple molds are used on each mold bar. However, contrary to the construction of Lampman patent, adequate extractive forces between the product and the pins are developed by forming one of the pins for each product bar with axially opposite facing cam shoulders, preferably helically arranged. These shoulders when the pins are freeze bonded to the product bars provide the extraction force required to withdraw the products from the molds (after a brief defrosting) the extractor bars which mount the pins.

In accordance with the present invention, the products are released from the extractor bars and their pins by rotating one (release) pin in each mold, to exert a screwing action on the product and dislodge it from the pins. By forming the extraction and camming shoulders on the release pins in accordance with the present invention, no significant dislodgement of the product surrounding the pin holes occurs, and no slugs of product wedge into the pins and prevent ejection or release. the release pins are basically smoothly tapered, with cylindrical upper ends and hence the product is released therefrom without dislodging or breaking off pieces of any chocolate dip or coating that may cover the tops of the product bars. Also, the pins emerge substantially free of the product and hence are readily cleaned and sterilized for reuse in the machine.

In addition to the rotatable ejector pin, a torque pin is provided in each bar which counteracts the torque, rotative force, etc. engendered by the rotation and screwing action of the ejector pins.

In the preferred embodiment of the present invention, the ejector and torque pins are placed diagonally of the product bars, i.e., they are adjacent corner portions of the bars and not at their midplanes. Since the product bars freeze from the inside out in the brine tank of the machine, the midplanes of the bars are softer than the corner portions and this placement insures that the release pin, at least, will be in the most firmly frozen portion of the bar and hence its screwing action can be effective.

Another advantage of the aforesaid diagonal location of the pins resides in that it facilitates placing the ejector pin on that side of the midplane of the bars which provides optimum thickness of product in the direction of said torque reaction. This diagonal disposition of the pins also provides a long torque arm which further prevents the torque reaction from breaking off chunks of the bars during the rotation and ejection process.

The rotary release pins are heat-insulated from the extractor bars to prevent conduction of heat from the extractor bars to the release pins and hence to the product, during freezing, after the product has been removed from the brine tank and before it has been released. This insures a good "bite" of the release pins on the product and minimizes product melting on the pins when the pins are rotated at the product release station.

Thus, all of the various criteria listed above are attained by the present invention, and hence the invention represents an improvement over the aforesaid Lampman and Lowenstein patents, as will be apparent from

BRIEF DESCRIPTION OF THE DRAWINGS

FIGURE 1 is a side elevation of a complete machine embodying the invention illustrating the major stations and elements of the machine.

FIGURE 2 is a diagrammatic perspective showing the pre-alignment of the rotary product release pins.

FIGURE 3 is a diagrammatic perspective showing a product approaching the pin twisting heads at the product conveyor.

FIGURE 4 shows the product release action by twisting the pins.

FIGURE 5 is a section taken on line 5—5 on FIGURE 1 at the extractor station.

FIGURE 5A is a detail of the extractor bar mounting on the mold conveyor.

FIGURE 6 is an enlarged side elevation of the product release end of the machine with parts in section.

FIGURE 6A is an enlarged view of an extractor assembly.

FIGURE 7 is a section at the release station taken on line 7—7 of FIGURE 6.

FIGURE 8 is a plan at the release station with parts broken away.

FIGURE 9 is a section at the release station taken on line 9—9 of FIGURE 7.

FIGURE 9A is a view like FIGURE 9 with the pin twisting head retracted for stick operation.

FIGURE 10 is an enlarged lateral section through a release head and product assembly.

FIGURE 11 is a view taken on line 11—11 of FIGURE 10.

FIGURE 12 is a view of one of the release pins drawn at somewhat less than full size.

FIGURE 12A is an enlarged view of the product releasing thread drawn at twice the scale of FIGURE 12.

FIGURE 12B is a section through the releasing thread drawn at four times the scale of FIGURE 12.

FIGURE 13 is a section showing a modified release pin, and without a heat insulating mounting.

FIGURE 13A is a fragmentary elevation of the pin looking along the line 13A—13A of FIGURE 13 and drawn at twice the scale of FIGURE 13.

FIGURE 13B is a side elevation of the release pin of FIGURE 13 embedded in the product and drawn at twice the scale of FIGURE 13.

FIGURE 14 is an enlarged view of a modified form of release pin.

FIGURE 14A is an enlarged view of another form of release pin.

FIGURE 15 is a schematic diagram of a control circuit for the machine.

FIGURE 16 is a timing diagram of the machine operating elements.

BRIEF DESCRIPTION OF THE PREFERRED EMBODIMENT

The embodiment of the invention illustrated and described herein is a machine for forming individual product bars of ice cream, sherbet or other frozen food products and these frozen products are extracted from the molds, dipped (if desired) and released to a bagging machine. All this is done without requiring the usual wooden sticks frozen into the product as a means for handling the bars during the extraction and dipping operations.

GENERAL DESCRIPTION

Referring to the diagram of FIGURE 1, FIGURES 2–4 which illustrate the essence of the present invention, and to the other drawings as required, a general description of the machine embodying the operation will now be presented. Ice cream mix, sherbet mix, or whatever food products is to be frozen is loaded into a fill unit F for filling the individual molds of the apparatus. The details of the fill unit are not critical to the present invention, a suitable unit being shown in the patents to Rasmussen 2,850,851 and 2,850,990. And endless line of mold assemblies illustrated generally at 10 are provided. Each mold assembly includes a row of individual molds 11 for the product bars, and in the machine embodying the present invention, 14 individual molds are provided, six of which appear in FIGURE 5.

The mold assemblies 10 are connected side by side on an indexed mold conveyor M and after having been filled with the unfrozen product they are carried down into a brine tank 12 which contains brine that is refrigerated down to freezing temperatures, this portion of the invention being known in the art, and as explained in detail in the patent to Rasmussen 3,031,978.

Soon after the mold assemblies have been immersed in the brine solution, an operator standing by the machine places an extractor bar B, which he has removed from a sterilizer S, on top of each of the mold assemblies 10 (see FIG. 5A). In accordance with the present invention, a set of two pins depends from the extractor bars B for each mold 11, these being a torque pin 13 and a rotary release pin 14. As will be described in detail presently, the release pin 14 is provided with screw threads or the like which present shoulders to the frozen product, namely extraction shoulders and cam shoulders which function when the release pins are rotated thereby forcing or propelling the product clear of both pins. The torque pin 13 prevents rotation of the product during this action.

In order to twist the release pins 14 they must be prealigned in a prealigner A, FIGURES 1 and 2. The prealigner is positioned above an upstream portion of the brine tank so that the pins can be prealigned with twisting heads before the product has been frozen solidly against them. The prealigner A simply comprises a lateral row of shoes 16 supported on a cross bar 16a that extends across the brine tank. The shoes 16 are disposed to cam the heads 14a on the rotary release pins square with the twist heads, as the extractor bars B are carried past the prealigning shoes by the mold conveyor M.

As the molds pass through the brine tank 12, the product therein is frozen solid and the molds are then carried up a ramp 12a to an extractor station E. Here, a vertically movable defrost pot 17 (FIGURE 6) and a synchronized extractor latch assembly indicated generally at 18 are provided (FIGURES 5, 6 and 6A). When the defrost pot 17 is raised it weakens adherence of the frozen products P to the individual molds 11, simultaneously the extractor assembly 18 is lowered to pick up the extractor bars B. When the defrost pot 17 is lowered, the extractor assembly 18 brings the extractor bars B up into position to be picked up by an indexed product conveyor C.

The product conveyor C picks up the extractor bars one by one and advances them step by step in synchronism with the step by step advance of the mold conveyor M to a dip station D. The dip D apparatus is used when it is desired to dip a product such as ice cream into a chocolate syrup. It lowers the extractor bars and associated product into a dip tank and returns them to the product conveyor C during a dwell period of the latter. As the product conveyor C continues in intermittent advance, it moves the extractor bars one by one to a release station R and it is at this station that the product is released by twisting the release pins as shown in FIGURE 4.

In FIGURE 3 an extractor bar B is approaching a row of twist heads 20, formed with recesses 20a aligned with the heads 14a on the release pins 14. During a dwell period of the product conveyor C, the heads 14a of the pins come to rest within the recesses 20a, and the twist heads 20 are rotated to turn the release pins 14. Because of the cam shoulder formation of the release pins, the product is screwed or cammed downwardly, free of attachment to the pins 13 and 14, the torque pin 13 taking the reaction force engendered by the twisting action of the release pins 14. The released product drops into a bagger 21 (FIGURE 1), the details of which are not critical to the present invention.

The extractor bars, freed of their product, are carried around onto the upper reach of the product conveyor C (Lampman, 3,335,579, FIG. 10) until the bars reach a transfer station T at the other end of the conveyor. Here, the bars are transferred to the upper reach of an extractor bar return conveyor 22 upon which they are fixedly supported and collected against a stop 22a adjacent a sterilizer S. The bars B are manually removed from the extractor return conveyor and placed into the sterilizer S by an operator. An operator also places the extractor bars on the molds and at the upstream end of the brine tank 12 as previously described, thereby completing the cycle. Details of the product conveyor and the transfer action just described are not critical to the present invention and the structure disclosed for this purpose in the Lampman Patent 3,335,579 is of the type herein illustrated.

It will be noted that at no time has the product P been touched by human hands or by any portions of the mechanism except the individual molds 11 in which the product was frozen, the pins 13 and 14 of the extractor bars B, and the bagger. Thus, to maintain sterility of the product, all that is necessary is that the extractor bars be sterilized as previously described, and the individual molds 11 are washed by a washer unit W and sterilized by a sterilizing spray unit S1 on the lower reach of the mold conveyor M (FIGURE 1). Thus sterility of the product is readily maintained in the apparatus of the present invention.

MOLD CONVEYOR DETAILS

Significant details of the molds conveyor M will now be described insofar as they are necessary to an understanding of the present invention. In general, the mold conveyor of the embodiment described is like that shown in the aforesaid Rasmussen Patent 3,031,978, to which reference is made for details not herein described.

The mold assemblies 10 include transversely extending mold bars 23 having upturned flanges 24 which push against the extractor bars B (FIGURES 2 and 5A) and advance them with the mold conveyor M. The ends 23 of the mold bars are mounted on special links of side conveyor chains 25 (FIGURE 5). The side chains 25 are advanced step by step by a distance equaling the center-to-center spacing of the mold bars by means of a sprocket and cylinder indexing assembly as disclosed in the aforesaid Rasmussen patent. The side chains pass over idler sprockets 26 at the filling end of the mold conveyor and over sprockets 28 at the extractor end. The sprockets 28 are cross connected by a shaft 28a and one of the sprockets is provided with a circular array of pins 30 corresponding in angular spacing to the spacing of the individual mold bars. A reciprocating ratchet 32 (FIGURE 1) is intermittently advanced and retracted by a main drive cylinder 34 to advance the molds step by step as described. The control details for the drive cylinder 34 and for the other elements of the machine are not critical to the present invention, it only being necessary that the elements be properly synchronized. A simplified circuit illustrating the principles involved is illustrated in FIGURE 15, to be described presently.

PRODUCT CONVEYOR

The product conveyor C has side chains 36, trained around sprocket pairs 37 and 38 (FIG. 6), the latter being driven by a pneumatic cylinder 39 which operates a ratchet and pin arrangement (not shown) like that of the main conveyor. The ends 40 of the extractor bars rest on side rails 41 of the product conveyor (FIG. 7), and ears 42 of the extractor bars are brought up ahead of the ends of the rails and between pins 43 which project laterally from links on the chains 36 (FIGS. 7 and 8), in order to advance the extractor bar. The rails 41 are interrupted at 41a (FIG. 6) to accommodate lowering of extractor bars at the dip station D, by a cylinder operated latch assembly 44 (FIG. 1) which resembles that of the extractor assembly 18. Except for the dip station D, which is only an optimal accessory, the product conveyor C is like that of the aforesaid Lampman patent. As the product conveyor indexes (through a distance twice that of the mold indexing) the pins 43 push the extractor bars free of the extractor assembly 18 and onto the side rails 41.

EXTRACTOR STATION

The action at the extractor station E, wherein the defrost pot 17 is raised to remove the freeze bond between the product P and the individual molds 11, and the extractor assembly 18 is lowered and then retracted to bring the extractor bars onto the product conveyor C, is basically like that of the aforesaid Lampman patent and only those details of this station will be described with are essential to a better understanding of the present invention relative to product release station at R, FIGURE 1.

The units at the extractor station E are operated by a pneumatic extractor cylinder 48 (FIGURES 1, 5 and 15). The upper end of the cylinder is secured to the frame and the piston rod 50 is secured to a lower cross bar 52 (FIGURE 5) from which extend upwardly projecting racks 54 meshing with pinions 55 on a cross shaft 56. The extractor assembly 18 comprises latches (FIG. 6A) carried by the lower ends of paired racks 57, which racks are also meshed with the pinions 55. The latches include a spring projected latch member 58 (FIGURE 6A) below a keeper lug 59. When the racks 57 are lowered (as the defrost pot 17 is raised) by the cylinder 48, the spring latches 58 cam over the ends 40 of the extractor bars B trapping the ends 40 between the latches and the upper keepers 59.

When the racks 57 are raised (in synchronism with lowering of the defrost pot 17) the extractor bars 18 are picked up from the mold conveyor M and brought up into position in front of the rails 41 of the product conveyor C. As mentioned, the product conveyor C is synchronized so that the pins 43 on the links of the side chains 36 are centered over the upwardly projecting ears 42 on the extractor bars B. Thus, on the next indexing advance of the side chains 36 of the product conveyor C, the ends 40 of the extractor bars slide from between the latch members 58 and 59 and onto the rails 41 which support them along the lower reach of the product conveyor. As seen in FIGURE 6, if a chocolate dip or the like is to be applied to the frozen products P, the extractor bars B are lowered through the gap 41a in the rails 41 to bring the products P into a dip tank 47, whereupon the extractor bars are raised again to be advanced toward the release station R. The latching mechanism at the dip station which picks up the extractor bars, lowers them, and returns them between the pins 43 of the side chains 36 of the product conveyor C which functions in the manner as that at the extractor station E.

PRODUCT RELEASE STATION

At the product release station, the extractor bars B are advanced into the twisting heads 20 (FIGURES 3 and 4) while the torque pin 13 and the release pin 14 are supporting the frozen products P which have been extracted from the molds at the extractor station E as previously described. Here a pneumatic cylinder operated rack and pinion assembly rotates the twist heads.

The mechanism for twisting the release pins 14 is shown in FIGURES 7–10. Side plates 60 of the product conveyor C, which support the side chains 36 and the extractor bar rails 41 previously described, also support a cross beam 62 that mounts the product release mechanism.

In the embodiment of the invention being illustrated, the product release mechanism is vertically retractable (compare FIGURES 9 and 9A) in order that the machine can be set up for using the more conventional wooden sticks in the product, as disclosed in the Rasmussen Patent 3,031,978. Thus the cross beam 62 mounts a vertically adjustable cross bar 64 and the latter can be moved up and down for the purpose just described by means of function cap screws 66. These cap screws are rotatably mounted in ears 68 projecting rearwardly from the cross beam 62 and are threaded into ears 70 projecting rearwardly from the cross bar 64. The lowered position of the cross bar 64 and hence of the release assembly mounted thereon is determined by stops 72 on the fixed cross bar 62 and shown in FIGURE 7 at the right and left ends of the cross bar 64.

The twisting heads 20 and the operating mechanism which operates them are mounted on the cross bar 64. The twisting heads are given about 1½ to 2 revolutions by a horizontal pneumatic cylinder 76 mounted at one end on a post 78 (FIG. 7) secured to a plate 80 that projects rearwardly (FIG. 9) from the cross bar 64. Below the plate 80 is a parallel companion plate 82, as best seen in FIGURES 7 and 9. The piston 84 of the pin twisting cylinder 76 is secured by means of a bracket 86 to a horizontally sliding rack 88 mounted on a tongued way 90 projecting rearwardly from the vertical cross bar (FIG. 9). Reciprocation of the rack 88 rotates fourteen spur gears 92, which are keyed to shafts 94 that extend through the plates 80, 82. The twisting heads 20 are secured to the lower end of the shafts 94, and when the cross bar 64 is lowered, the twisting head slots 20a will freely receive the pre-aligned heads 14a of the release pins (FIGS. 4 and 7). Thus, with the mechanism just described, the twisting heads can be turned from their pin receiving positions of FIGURES 3 and 7 to cause rotation of the release pins 14 and consequent ejecting of the product bars P as shown in FIGURE 4 and as described previously.

As previously mentioned, FIGURE 9A shows the mechanism set up for handling products with wooden sticks frozen therein. In this set up, the function cap screws 66 are rotated to raise the cross bar 64 and hence the release mechanism clear of the extractor bars. Shield plates 100 are bolted to the cross beam 62. Extractor bars B1 are substituted for the stickless operation extractor bars B previously described. The stick handling bars B1 include stick gripping clips 102 for operation in accordance with the Rasmussen Patent 3,031,978 previously referred to.

RELEASE PIN CONSTRUCTION

As previously mentioned, the rotatable release pins 14 are formed so as to provide cammed oppositely facing shoulders for extraction and for forcing the product downwardly free of the pins (including the torque pin 13) when the twisting heads 20 are rotated by the mechanism just described. A preferred release pin construction and the mode of operation thereof are illustrated in FIGURES 10 to 12B.

Before describing the release action, and as previously mentioned, in order to augment the extraction "bite" and the releasing action of the cam shoulder means on the release pins, the pins are heat-insulated from the extractor bars B. Thus the heat stored in the extraction bars B will not readily flow to the release pins, thereby initiating a thawing action between the pins and the frozen products P. This, in turn, provides a firmer grip or bite of the shoulders of the pins upon the product, and hence makes both extraction and the release action incident to the rotation of the pins more reliable.

In the form of the invention illustrated, the release pins 14 formed of stainless steel are rotatably mounted within the extractor bars B by means of shanks 106 integral with the stems 108 of the pins, which stems merge into tapered end portions 110, the stem and end portions in the product being smoothly tapered. Metal to metal contact between the pins and extractor bars is prevented by means of insulating bushings 112 which may be formed of plastic, nylon, hard rubber, and other materials that are relatively poor heat conductors, which bushings surround the shank 110 of each pin, and hence accommodate rotation of the pin shanks within the extractor bars without metal to metal contact therebetween.

The square heads 14a of the pins are insulated from the tops of the extractor bars by means of plastic or fiber heat insulating washers 114, thereby preventing metal to metal contact in this region. The pins are retained against accidental dislodgement from the extractor bars by lower keeper washers 116 which, in this case are formed of small rubber bands that grip metal collars 118 formed integrally with the pin shanks.

Thus, with this construction the pins can be rotated and yet the flow of heat from the extractor bars B (which are always subjected to ambient temperatures in the room in which the machine is mounted) to the pins 14 is impeded. This, in turn, insures that the release pins will exert a good "bite" on the frozen product during the release extraction and actions.

As to the release pin formation, in the preferred embodiment of the invention shown in FIGURES 12-12A, the shoulders which provide both extraction forces and the releasing action characteristic of the present invention are provided by a partial helical thread or cam construction 120. In this pin construction, as best seen in FIGURES 12A and 12B, the tapered end portion 110 of the pin is of somewhat reduced diameter relative to the stem portion 108, as can be seen at their junction. Below this junction is provided the aforesaid helical cam or thread configuration 120 which provides axially oppositely facing shoulders in the form of downwardly facing cam shoulders 122, and upwardly facing extraction shoulders 124. When the product freezes around the pins, a helical body of "slug" of product 125 (FIG. 12B) projects radially inwardly from the wall of the pinhole. Thus the extraction force is limited only by the force which will shear the slug 125 from the parent body, and since the material is frozen, its shear strength is quite high.

When the twisting heads 20 are rotated thereby turning the pins 14, the cam shoulders 122 cam against the frozen slugs 125 as well as against a body 126 (FIG. 12B below the threads 120 and force the products downwardly free from the tapered end portions 110 of the pins. In this form of the invention, the helical portions 120 actually act somewhat as screw threads against the product.

The torque imparted to the product P rotation of the pins 14 is taken up by the torque pins 13 as previously described. As seen in FIGURE 11, the rotation of a release pin 14 in a frozen product bar P will be counterclockwise as indicated by the arrow at that pin. This, of course, will tend to rotate the entire bar counterclockwise due to frictional force, but the torque thereby engendered is assumed by the torque pin 13 which can be considered to exert a restraining on reaction force indicated by the arrow F in FIGURE 11. The reaction force F must be absorbed by the product without fracture thereof, and the broken lines c in FIGURE 11 indicate potential fracture zones. However, the pins 13 and 14 are placed diagonally in the molds so that the bulk of the frozen product is provided on the side of the torque pins 13 which must resist the fracturing action along the lines c as indicated generally in FIGURE 11. Also, the diagonal pin disposition maximizes the pin spacing and hence maximizes the torque arm, thereby minimizing the reaction force F.

For simplicity in claiming, this diagonal arrangement of the torque pin 13 and the release pin 14 relative to the mold and to the product will be termed an arrangement wherein the torque pin 13 is "remote from the fracture side of the product." In a typical example, in the embodiment of the invention being described herein (FIG. 11), the products have a thickness b of one inch and a width $a$ of $2\frac{1}{16}$ inches at their upper ends. Of course, the molds taper to smaller dimensions towards their bottoms, as seen in the other figures. The lateral spacing between the two pins 13 and 14 indicated at $x$ is about $1\frac{3}{16}$ of an inch whereas the fore and aft spacing of the pins indicated at $y$ is about $\frac{3}{8}$ of an inch.

Thus, it can be seen that the cam shoulders 122 of the pin threads 120, which face downwardly but are inclined upwardly in the direction of rotation when ejecting the product, to expel the product along the pins and hence release it. The other shoulders 124 facing in the axially opposite direction provide the grip with the frozen product necessary to extract the same from the molds and permit the extractor bars B and their dependent products to be lifted up into position into the product conveyor C, as previously described. The insulating sleeves and washers shown in FIGURES 10–12 minimize the flow of heat from the relatively large mass extractor bars B to the relatively small mass release pins 14, between the time that the molds are withdrawn from the brine tank and the products are taken to the release station R. This optimizes the biting and lifting action available from the axially upwardly facing shoulders 124 during extraction, as well as that available during the releasing, unscrewing or ejecting action provided by the cam shoulders 122 when the pins are rotated.

MODIFIED PIN CONSTRUCTIONS

FIGURES 13 and 13A show a modified pin construction where in this construction the pins 14b are not provided with an insulating mounting with extractor bars B; however, it is understood that the insulating mounting shown in FIGURES 10 and 12 can be applied to any pin construction as desired.

In pin construction of FIGURES 13 and 13A, instead of a helical screw or thread camming shoulders like that previously described, axially opposed shoulders are provided by a series of notches spaced axially along the tapered portions 110b of the pins and facing in radially opposite directions. The notches 130 provide axially downwardly facing cam shoulders 132 and these are inclined upwardly in the direction of pin rotation (FIG. 13A) and hence serve to cam the product free of the pins. The notches also provide axially upwardly facing shoulders 134 which resist the tendency of the frozen products P to dislodge during the extraction process and support the products on the pins before they reach the release station R. Product shear slugs 135 (FIG. 13B) are formed with this construction which provide for the necessary extraction and release forces.

In the pin construction 14c of FIGURE 14, a thread 140 is formed on a cylindrical portion 141 formed between the tapered portion 110c of the pin and its stem 108c. The helical tread 140 of this construction is of coarser pitch than the thread 120 of the construction of FIGURES 12 to 12B, and its upper end is spaced from the stem 108c by ½ thread pitch or more. The thread 140 is superposed entirely upon the outer envelope or surface of the pin, and hence is a relief or sculptured thread. The thread 140 has sharp edges and when the pin is rotated creates its own thread in the product as it expels the product. This pin construction is especially effective on high over run products such as ice milk, which has a pasty consistency after freezing.

FIGURE 14A shows a pin construction 14d, found to be effective on products such as flavored sugar solutions (ice popsicles), frozen eggs or the like. Here the tapered portion 110a has formed therein a coarse pitch thread 150 which presents a concavity to the product and hence is an intaglio thread. A reduced section 151 is provided below the tapered stem portion 108d. In all threads, however, downwardly facing cam surfaces are provided by the helical configurations for ejecting the products from the pins, and upwardly facing shoulders are provided for offering a definite extraction force when the extractor bars are withdrawing the products from the molds and carrying them to the station R.

CYCLE CONTROL SYSTEM

As previously mentioned, the design of the cycle control system for the various pneumatic cylinders is not critical to the present invention and the system to be explained is merely exemplary of a suitable type of control. The control illustrated is by means of solenoid operated valves, but pneumatic pilot and slave valve systems can also be employed. Also, the usual flow control and relief valves can be employed in the various lines to the air cylinders, in accordance with conventional hydraulic practice.

FIGURE 15 is a schematic diagram of an electrical control system designed to carry out the timing cycle of the various cylinders and their associated mechanisms shown in FIGURE 16. Since the mold conveyor and product conveyor indexing cylinders 34, 39 operate in synchronism they can be controlled by a single reversing valve 146, which is a spring biased, solenoid-operated valve moved in one direction by a solenoid 148 and in the other direction by a return spring 149.

The solenoid 148 is energized by rotary wafer switch 150 having a wiper 152 that engages and disengages the switch segment 154. This switch can be rotated by hand, or by an electric motor 156 at a speed that will produce substantially one complete cycle having three operative conditions of the parts, in three seconds. The solenoid 148 has just been energized to shift the valve 146 in FIG. 15, but the cylinders 34 and 39 have not yet started to index.

A cycle is illustrated in FIGURE 16 which is self-explanatory when related to previous descriptions of the mode of operation of the various conveyors and units of the illustrated apparatus. In fact, the motor 156 which operates the control assembly can also operate the extractor bar return conveyor 22, as illustrated in FIGURE 1.

Comparison of the position of the switch wafer 150 of FIGURE 15, which wafer has the cycle positions 1, 2 and 3 indicated thereon, with the timing diagram of FIGURE 16 showing the same cycle positions, will clearly reveal how the sequence of operations of the product and mold conveyors shown in the cycle diagram of FIGURE 16 is attained by the system of FIG. 15.

The dip cylinder 44 is lowered when the extractor cylinder 48 is raised, to simultaneously lower extractor bars at the extractor and dip stations, hence these cylinders are synchronized. Also, the pin twisting (product release) cylinder 76 is advanced when the extractor bars are being lowered. These actions occur during conveyor dwell periods as is shown in the cycle diagram of FIGURE 16. Thus the product release, dip and extractor cylinders are connected to a second four way reversing valve 160 which is operated in one direction by solenoid 162 and returned by a spring 164 in a conventional manner well known in the hydraulic control art. The solenoid 162 is controlled by a switch wafer 170 operating in synchronism with the wafer 150 previously described. The switch segment 172 of wafer 170 is engaged by a wiper 174 on the same shaft that mounts the wiper 152. The position of the segment 172 of wafer 170 relative to the transition points 1, 2 and 3 is illustrated in FIGURE 15, and it can be seen how this wafer arrangement attains the cycle timing illustrated diagrammatically in FIGURE 16.

As mentioned, the product release cylinder 76 is likewise controlled by the four way reversing valve 160. The connections to the air supply and exhaust lines of the valve 160 and the product release cylinder 76 are such as to provide dwell period of the product release cylinder and hence of the twisting heads 20 which corresponds to the advance periods of the two conveyors. The twisting action of the pins occurs during the dwell period of both the product and the mold conveyors, as shown in

We claim:

1. Apparatus for extracting molded frozen food products or the like from their molds and releasing the products from their extractors, said apparatus being of the type wherein the extractors have pins depending into the molds; said extractors having depending therefrom a set of pins for entry into each mold, one pin of the set being a tapered and rotatable release pin having opposed, axially facing product-engaging shoulders formed thereon, those shoulders which face the dependent end of the pin being inclined upwardly in their direction of rotation when releasing the product, another pin of the set being a torque pin for preventing rotation of the product during release, and means for rotating said release pin through an angle sufficient to release the product from both pins.

2. The apparatus of claim 1, wherein said means for rotating the release pin comprises a head on the pin, a gear above said extractor, and spline type coupling between the head of said pin and said gear for slidable coupling engagement.

3. The apparatus of claim 1, wherein the product-engaging shoulders on the release pin comprise V-notches.

4. The apparatus of claim 1, wherein there are two pins in a set, the molds are generally rectangular in horizontal section, and the pins are diagonally arranged in the molds so that the torque pin is remote from the fracture side of the product.

5. The apparatus of claim 1, wherein the product-engaging shoulders on the release pin are formed by a partial helical thread.

6. The apparatus of claim 5, wherein said thread is a sculptured thread.

7. The apparatus of claim 5, wherein said thread is an intaglio thread.

8. The apparatus of claim 1, wherein heat insulating means are provided for retarding the flow of heat from said extractors to those portions of the release pins which are frozen into the product.

9. The apparatus of claim 8, wherein said heat insulating means comprises an insulating bushing between the release pins and their extractors.

10. A machine for forming stickless frozen food products or the like comprising a plurality of open top molds; an indexed mold conveyor for carrying said molds through product filling, freezing, defrosting and extracting stations; product extractor bars having rotatable tapered release pins for freeze bonding to the product in each mold, an indexed product conveyor for receiving said extractor bars and having a product release station; means at said extracting station for lifting said extractor bars with frozen products depending from said pins and transferring the bars to said product conveyor; and means at said product conveyor release station for rotating said pins to release the frozen products; the improvement wherein said rotatable release pins have shoulder means formed thereon for providing an axial cam action on the product when the pins are rotating in the product release direction; said release pin rotating means comprising slidable couplings between upper end portions of said pins and superposed pin rotators disposed at said product release station, said couplings being coupled and uncoupled in the direction of product conveyor motion, and torque means for restraining the product from rotating during release.

11. The apparatus of claim 10, wherein means are provided at said mold conveyor for aligning the couplings on the release pins with the couplings on the pin rotators before the release pins have been freeze-bonded to the product.

12. The machine of claim 11, wherein said torque means comprises torque pins for each mold depending from said extractor bars, said torque pins being tapered and non-rotatable.

13. The apparatus of claim 10, wherein said shoulder means on the release pins comprises a plurality of shoulders which face in axially opposite directions, those shoulders which face the dependent ends of the release pins being inclined upwardly in their direction of rotation during product release.

14. The apparatus of claim 13, wherein said shoulders are formed by helical thread means.

15. The apparatus of claim 10, wherein heat insulating means are provided for retarding the flow of heat from said extractor bars to those portions of the release pins which are frozen into the product.

16. The apparatus of claim 15, wherein said heat insulating means comprises an insulating bushing between the release pins and their extractors.

17. The apparatus of claim 10, wherein said pin rotators each mount gears and the gears are turned by a laterally extending rack, and means for operating said rack during a dwell period of said indexed conveyors.

References Cited

UNITED STATES PATENTS

| | | | |
|---|---|---|---|
| 2,076,377 | 4/1937 | Loewenstein | 107—8.05 |
| 3,031,978 | 5/1962 | Rasmusson | 107—8.05 |
| 3,335,579 | 8/1967 | Lampman | 107—8.05 |

WALTER A. SCHEEL, Primary Examiner

ROBERT I. SMITH, Assistant Examiner

PO-1050
(5/69)

UNITED STATES PATENT OFFICE
CERTIFICATE OF CORRECTION

Patent No. 3,489,103      Dated JANUARY 13, 1970

Inventor(s) KATSUJI HIRAHARA ET AL

It is certified that error appears in the above-identified patent and that said Letters Patent are hereby corrected as shown below:

Column 1, line 27:     after "frozen" insert --food--.

Column 6, line 17:     delete "with" and insert --which--.

Column 7, line 23:     insert --64-- after "bar".

Column 8, line 35:     after "12B" insert a --)-- (parenthesis).

Signed and sealed this 6th day of April 1971.

(SEAL)
Attest:

EDWARD M. FLETCHER, JR.
Attesting Officer

WILLIAM E. SCHUYLER, JR.
Commissioner of Patents